United States Patent
Caldwell et al.

(10) Patent No.: US 7,283,309 B2
(45) Date of Patent: Oct. 16, 2007

(54) WIDE-RANGE, WIDE-ANGLE, ROTATABLE COMPOUND ZOOM

(75) Inventors: James Brian Caldwell, Petersburg, VA (US); Terry Lee Zarnowski, Homer, NY (US)

(73) Assignee: Panavision International, L.P., Woodland Hills, CA (US)

(*) Notice: Subject to any disclaimer, the term of this patent is extended or adjusted under 35 U.S.C. 154(b) by 0 days.

(21) Appl. No.: 11/071,125

(22) Filed: Mar. 2, 2005

(65) Prior Publication Data

US 2006/0056050 A1   Mar. 16, 2006

Related U.S. Application Data

(60) Provisional application No. 60/603,341, filed on Aug. 20, 2004.

(51) Int. Cl.
G02B 15/14 (2006.01)
(52) U.S. Cl. ............................ 359/676; 359/680
(58) Field of Classification Search ............... 359/689, 359/680–682
See application file for complete search history.

(56) References Cited

U.S. PATENT DOCUMENTS

| | | |
|---|---|---|
| 2,454,686 A | 11/1948 | Back |
| 3,192,829 A | 7/1965 | Yamaji |
| 3,947,084 A | 3/1976 | Noyes |
| 3,970,366 A | 7/1976 | Sekiguchi |
| 4,033,674 A | 7/1977 | Sekiguchi |
| 4,147,410 A | 4/1979 | Shimomura et al. |
| 4,411,488 A | 10/1983 | Neil |
| 4,676,581 A | 6/1987 | Roberts |
| 4,909,614 A | 3/1990 | Itoh et al. |
| 4,971,428 A | 11/1990 | Moskovich |
| 5,144,480 A * | 9/1992 | Ohshita ................ 359/432 |
| 5,194,886 A | 3/1993 | Mukai et al. |
| 5,270,857 A | 12/1993 | Oizumi et al. |
| 5,448,411 A | 9/1995 | Morooka |
| 5,721,641 A | 2/1998 | Aoki |
| 5,771,123 A | 6/1998 | Hamano |
| 5,790,309 A | 8/1998 | Ohtake |

(Continued)

OTHER PUBLICATIONS

D. F. Horne, "Lens mechanism technology," Crane, Russak & Company, Inc., New York, Oct. 1975 (p. 39).

(Continued)

*Primary Examiner*—Jordan M. Schwartz
(74) *Attorney, Agent, or Firm*—Morrison & Foerster LLP

(57) ABSTRACT

A compact zoom lens system providing a wide-range, ultra-wide angle optionally rotatable compound zoom is disclosed. In one embodiment, the optical design is comprised of an NPP kernel followed by a PP relay with four independently moving groups, two on each side of an intermediate image. The front group is stationary with respect to the image plane, as are two fold prisms. The kernel has a zoom ratio of about 2:1, and the zoom relay has a magnification ratio of about 4:1, giving a total zoom ratio of about 8.6:1. The PP relay is comprised of two independently moving positive groups. The focal lengths covered by the zoom range have a 35 mm still camera equivalent of about 21 mm to 180 mm. The aperture of the system ranges from about f/2.8 to f/6.3, but is constant at about f/2.8 from about 3 mm through 6.2 mm focal length.

28 Claims, 12 Drawing Sheets

U.S. PATENT DOCUMENTS

| | | | |
|---|---|---|---|
| 5,835,272 A | 11/1998 | Kodama | |
| 6,157,494 A | 12/2000 | Nagata | |
| 6,271,973 B1 * | 8/2001 | Ohtake et al. | 359/689 |
| 6,493,150 B2 * | 12/2002 | Kato | 359/646 |
| 6,639,729 B2 * | 10/2003 | Tanaka et al. | 359/676 |
| 7,142,370 B2 | 11/2006 | Sato | |
| 2003/0133200 A1 | 7/2003 | Sato | |

OTHER PUBLICATIONS

Ellis I. Betensky et al., "Zoom Lenses II," Proceedings of SPIE-The International Society for Optical Engineering, SPIE vol. 3129, Jul. 28-29, 1997 (pp. 90-96).

Allen Mann, "Selected Papers on Zoom Lenses," SPIE Optical Engineering Press, SPIE Milestone Series, vol. MS85, Copyright 1993 (entire volume).

Iain A. Neil et al., "Zoom Lenses III," Proceedings Of SPIE-The International Society for Optical Engineering, vol. 4487, Jul. 31, 20001 (entire volume).

Allen Mann, "Zoom Lenses," Proceedings, SPIE-The International Society for Optical Engineering, vol. 2539, Jul. 11-12, 1995 (entire volume).

* cited by examiner

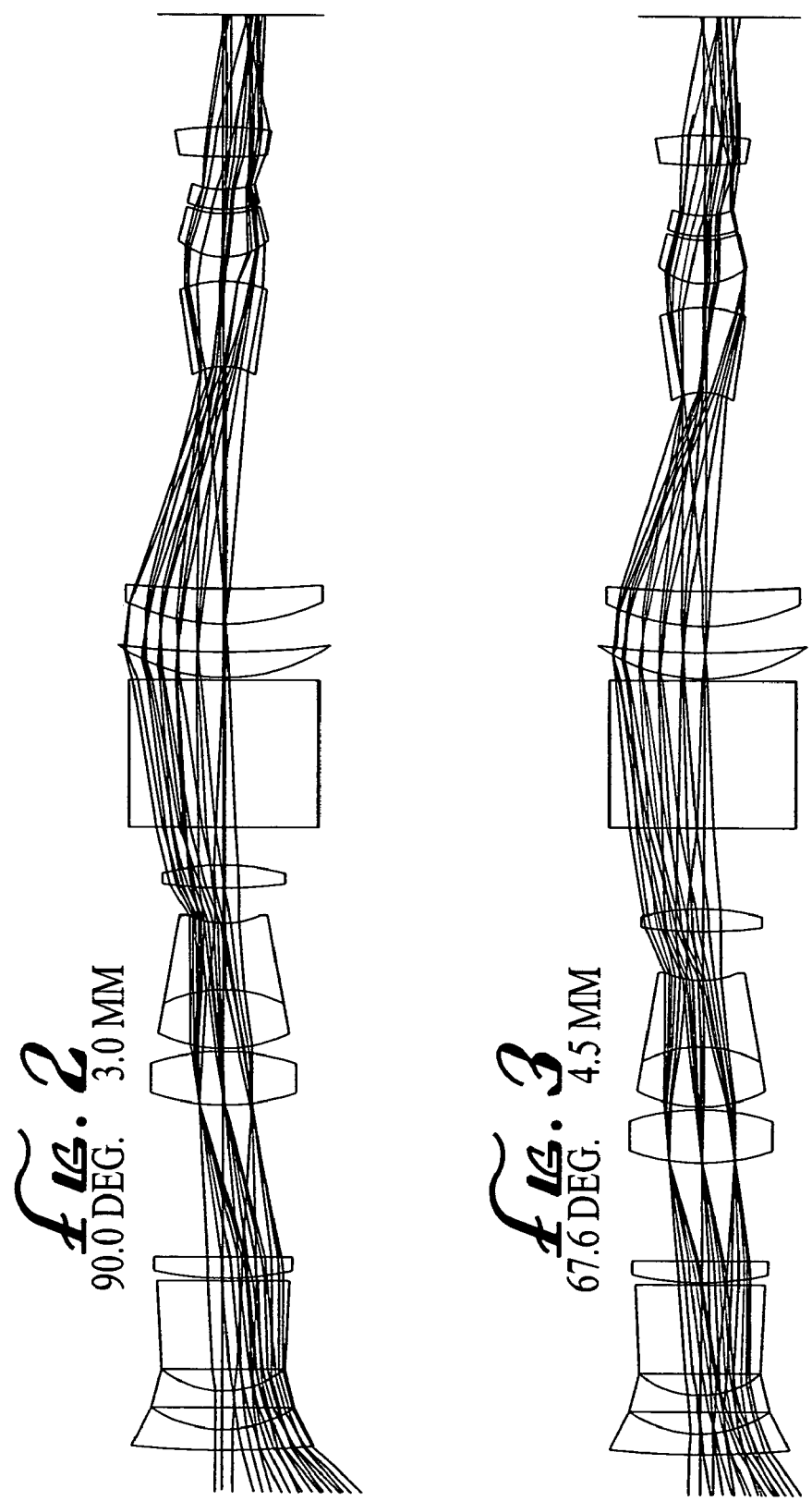

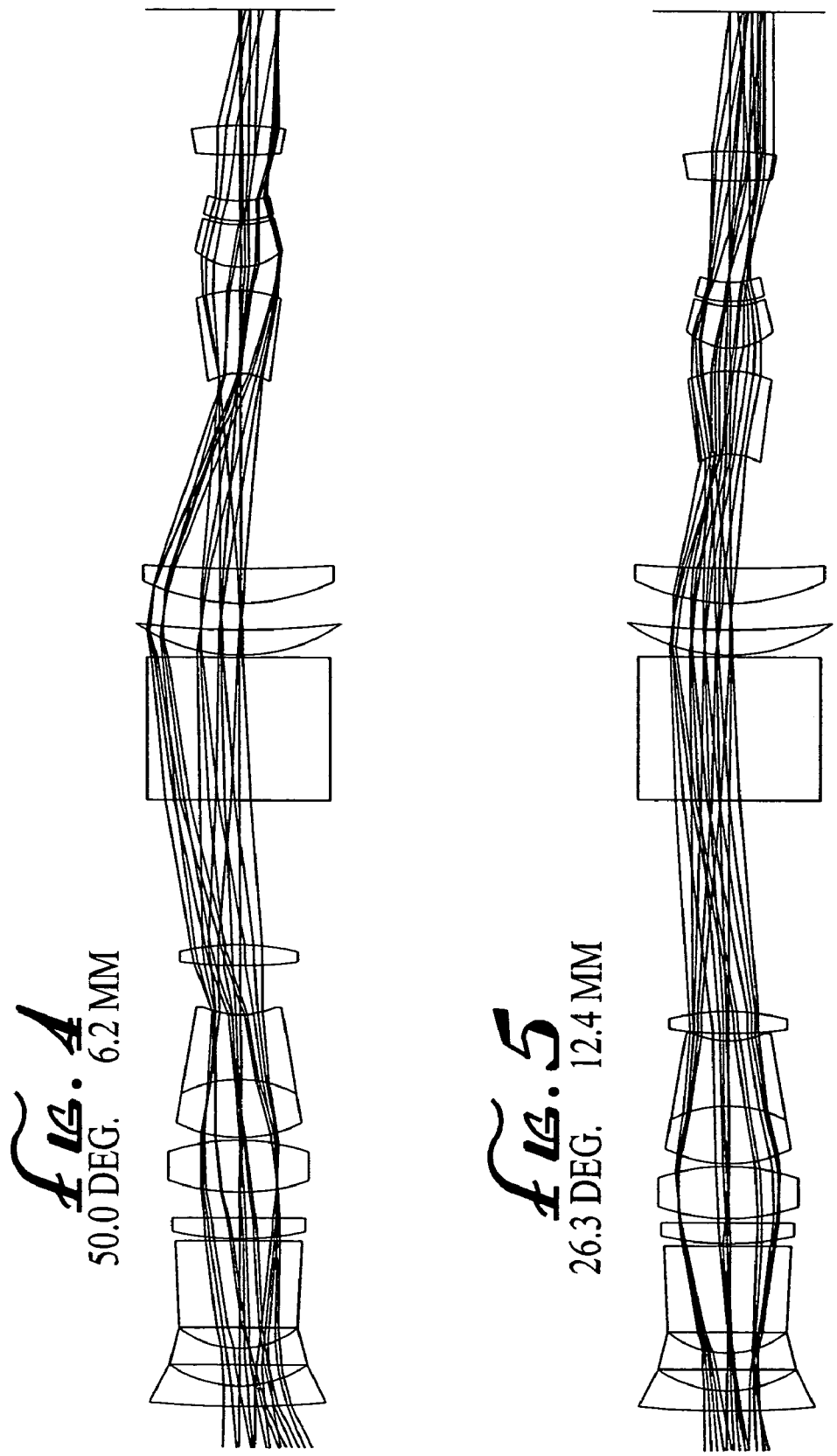

13.3 DEG. 25.0 MM

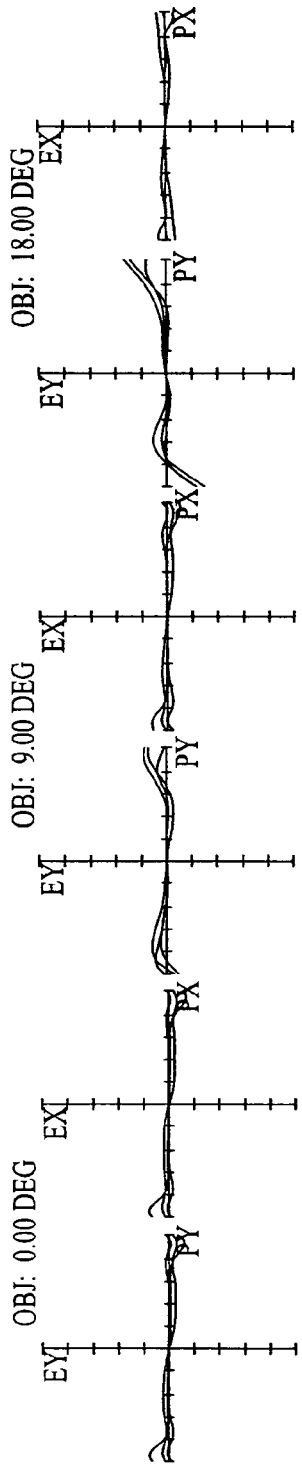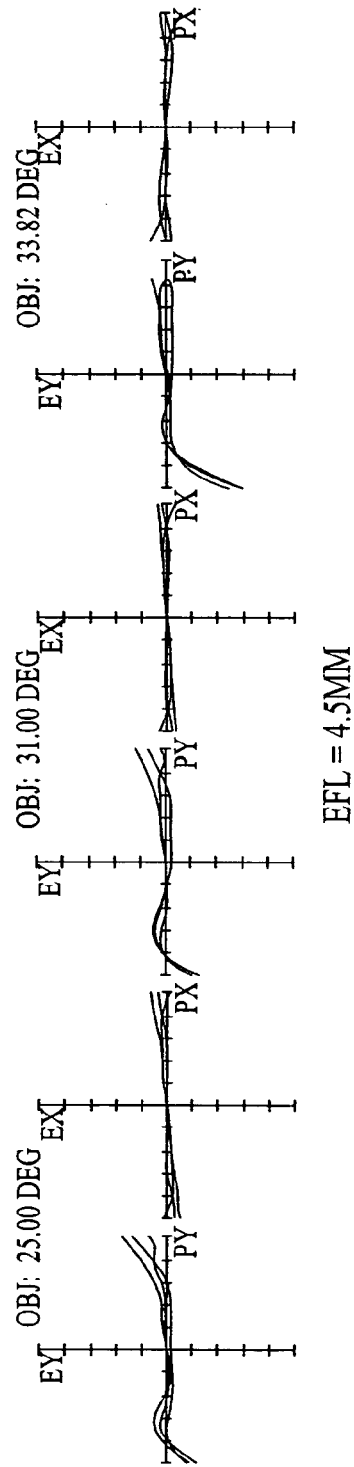
FIG. 11
TRANVERSE RAY FAN PLOT
EFL = 4.5MM
MAXIMUM SCALE: +/- 50.000 MICRONS.

TRANVERSE RAY FAN PLOT

EFL = 6.2MM

MAXIMUM SCALE: +/- 50.000 MICRONS.

TRANVERSE RAY FAN PLOT
EFL = 12.4MM
MAXIMUM SCALE: +/− 50.000 MICRONS.

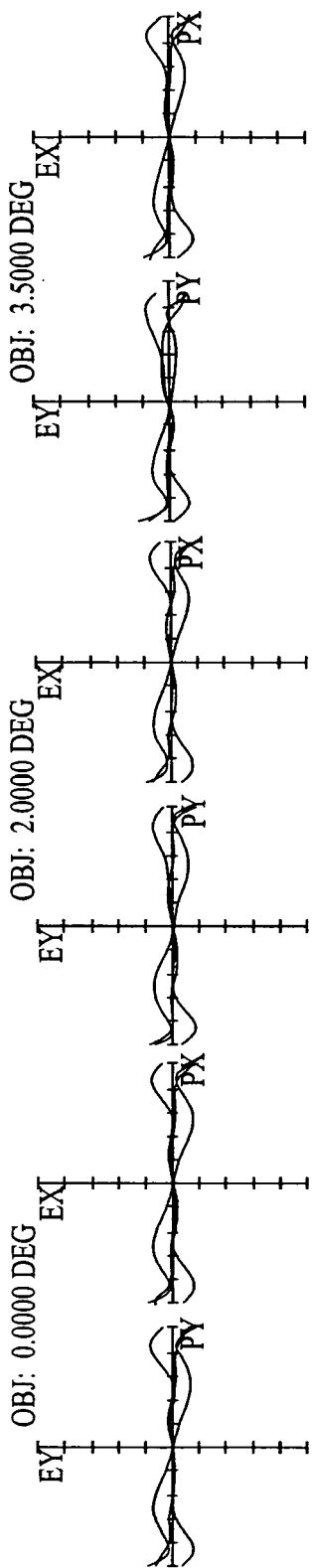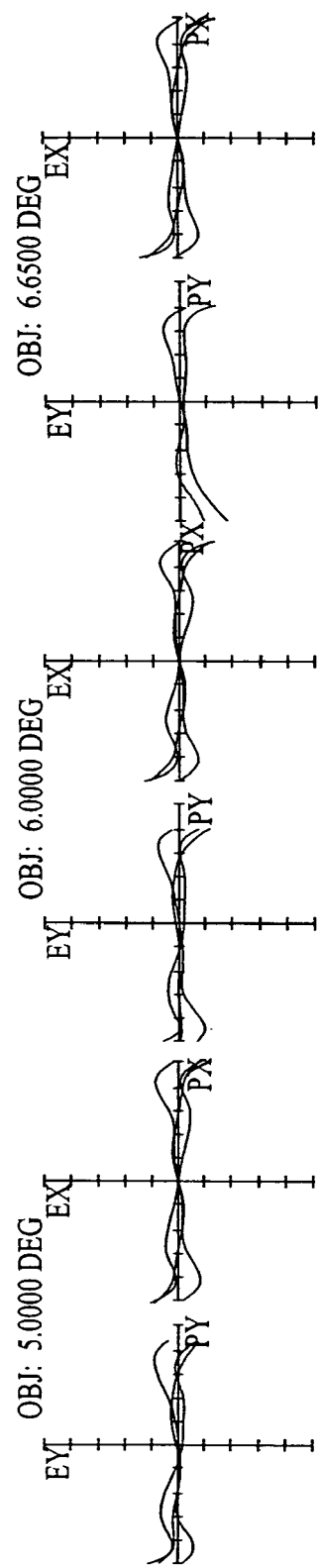
Fig. 14
TRANVERSE RAY FAN PLOT
EFL = 25MM
MAXIMUM SCALE: +/- 50.000 MICRONS.

WIDE-RANGE, WIDE-ANGLE, ROTATABLE COMPOUND ZOOM

CROSS-REFERENCE TO RELATED APPLICATIONS

This application is related to U.S. patent application Ser. No. 10/622,914, filed on Jul. 18, 2003, the contents of which are incorporated by reference herein, and claims the benefit under 35 USC 119(e) of U.S. Provisional Application No. 60/603,341, filed Aug. 20, 2004.

BACKGROUND OF THE INVENTION

1. Field of the Invention

The present invention relates, generally, to zoom lenses, and in particular embodiments, to an optionally rotatable compound zoom lens that provides a wide focal length range and a wide field of view and is small in size to fit in consumer products such as cellular telephones and other products with compact cameras.

2. Description of Related Art

Notably lacking in the prior art are zoom lenses having a zoom ratio greater than four combined with a maximum field of view at the short focal length position of 85 degrees or more. Although such zoom lenses are known in the field of broadcast zoom lenses, these are typically large, complex and expensive designs. Examples can be found in U.S. Pat. No. 5,745,300, and in Japanese Patents 62-153,913; 08-136,808; 09-015,501; 09-033,812; and 11-030,749.

A more compact, wide-range, wide-angle zoom can be found in U.S. Pat. No. 6,038,084, although the performance of the examples is poor despite significant complexity.

Recently a novel compound zoom system was described in U.S. patent application Publication No. 20040021953, the contents of which are incorporated herein by reference. This system comprises a zoom lens that forms an intermediate image, followed by a zooming relay that re-images the intermediate image to a final image plane. Such a design approach has a number of potential advantages over conventional zoom lens designs, including large zoom range, wide field of view, high image quality, and flexibility in arranging fold mirrors or prisms. However, the zoom system disclosed in U.S. patent application Publication No. 20040021953 does not provide for a compact wide-range wide-angle zoom lens that is suitable for mass-market applications.

Therefore, there is a need for a compact and relatively simple zoom lens with both a wide zoom range and wide field angle that can be economically produced in high volume. Such a zoom lens would have wide-ranging applications in digital still and video cameras, cell phones, PDA's, and the like.

SUMMARY OF THE INVENTION

The lens system according to embodiments of the present invention provides for a wide-range, ultra-wide angle optionally rotatable compound zoom with sufficient performance to be used with a 3 megapixel class sensor. In one embodiment, the focal lengths covered by the zoom range have a 35 mm still camera equivalent of about 21 mm to 180 mm.

What makes this range particularly interesting is the extremely wide angle starting point. Compound zoom technology allows for a very small front element diameter even with a very large zoom range and extremely wide field of view.

In one exemplary embodiment of the present invention, the vertex length is about 98 mm. In order to allow the system to be used in a compact package, two fold prisms have been included in the design. In this exemplary embodiment, the folded optics train occupies only about 15.6 cc, and is small enough to occupy only a small "L" shaped portion of a box-shaped volume of about 36 cc (e.g. about 57.28 mm×48.36 mm×12.97 mm), leaving about 57% of the total volume available for non-optical parts (electronics, mechanical parts, and industrial design features). The working distance of the system is sufficient to place a third fold prism or mirror just before the image plane. This third fold prism or mirror could be used to simplify the sensor placement, or it could also be used to incorporate a true SLR optical viewfinder.

In this exemplary embodiment, the optical design is comprised of an NPP kernel followed by a PP relay, with a stationary P lens group in between. The kernel, as defined herein, includes all lens and zoom groups on the object space side of the stationary P lens group, while the PP relay is a zooming relay that includes all zoom groups on the image space side of the stationary P lens group. There are four independently moving zoom subgroups altogether, two on each side of an intermediate image. The front lens group is stationary with respect to the image plane, as are both of the fold prisms. The kernel alone has a zoom ratio of about 2:1, and the zooming relay has a magnification ratio of about 4:1, giving a total zoom ratio of about 8.6:1. The PP relay, comprising two independently moving positive zoom subgroups, has a notably simple structure which contributes significantly to the simplicity of the system as a whole. Because both zoom subgroups are positive, the total number of elements is minimized while maintaining a very high image quality.

In this exemplary embodiment, the aperture of the system ranges from about f/2.8 to f/6.3, but is constant at about f/2.8 from about 3 mm through 6.2 mm focal length. From about 6.2 mm to 25 mm the aperture drops gradually from about f/2.8 to f/6.3.

BRIEF DESCRIPTION OF THE DRAWINGS

FIG. 2 illustrates an unfolded layout of the compound zoom lens at Zoom Position Z1 according to embodiments of the present invention.

FIG. 3 illustrates an unfolded layout of the compound zoom lens at Zoom Position Z2 according to embodiments of the present invention.

FIG. 4 illustrates an unfolded layout of the compound zoom lens at Zoom Position Z3 according to embodiments of the present invention.

FIG. 5 illustrates an unfolded layout of the compound zoom lens at Zoom Position Z4 according to embodiments of the present invention.

FIG. 11 illustrates transverse ray aberration plots at Zoom Position Z2 with an EFL of about 4.5 mm and a FOV of about 67.6 degrees according to embodiments of the present invention.

FIG. 14 illustrates transverse ray aberration plots at Zoom Position Z5 with an EFL of about 25 mm and a FOV of about 13.3 degrees according to embodiments of the present invention.

DETAILED DESCRIPTION OF PREFERRED EMBODIMENTS

In the following description of preferred embodiments, reference is made to the accompanying drawings that form a part hereof, and in which is shown by way of illustration specific embodiments in which the invention may be practiced. It is to be understood that other embodiments may be utilized and structural changes may be made without departing from the scope of the preferred embodiments of the present invention.

Figure 1:
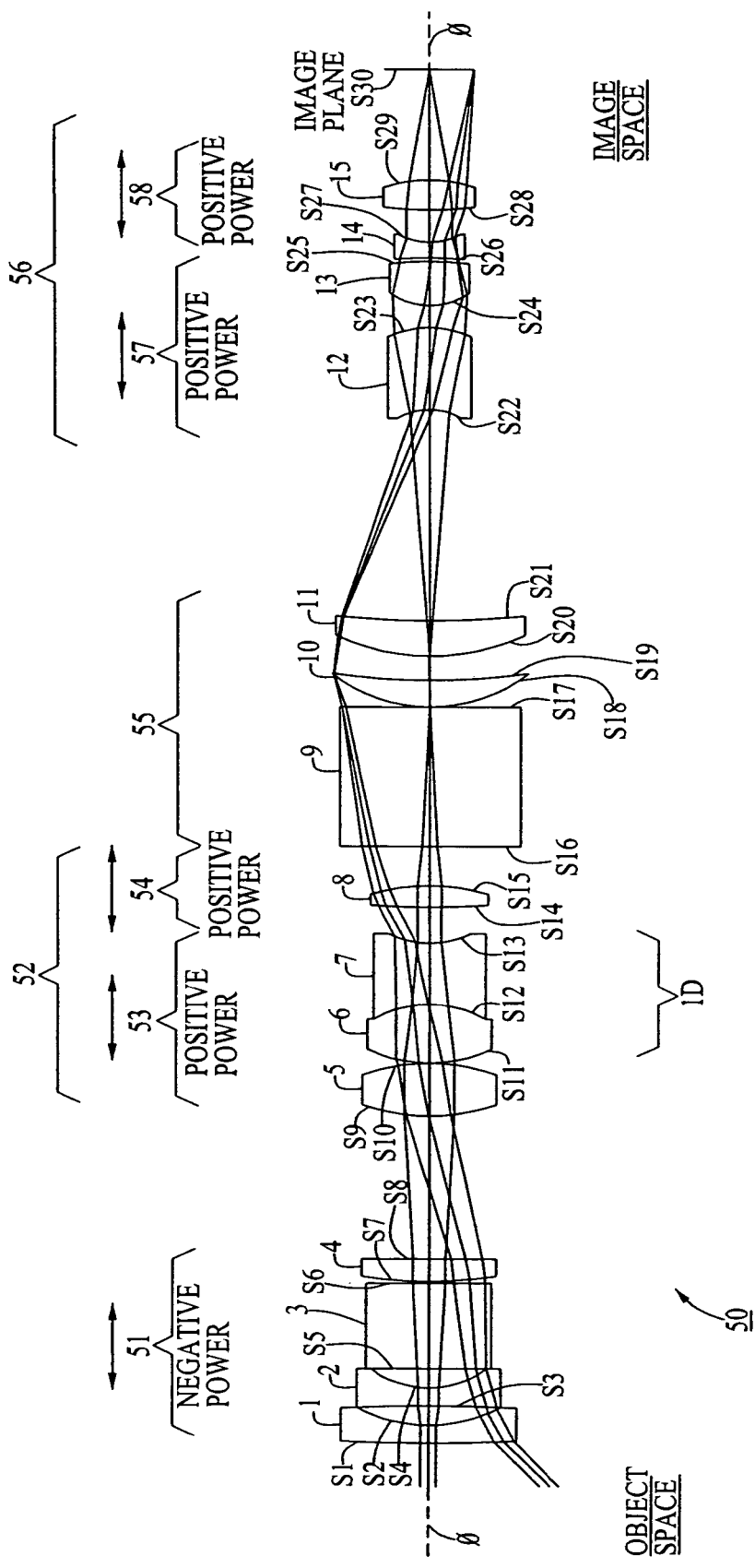
FIG. 1 illustrates an unfolded layout of the compound zoom lens with lens elements and surfaces identified according to embodiments of the present invention.

A lens system according to embodiments of the present invention is a wide-range, ultra-wide angle optionally rotatable compound zoom with sufficient performance to be used with a 3 megapixel class sensor. FIG. 1 illustrates an unfolded layout of one exemplary embodiment of the compound zoom lens with lens elements and surfaces identified. The specifications of this exemplary embodiment (without the rotation feature) are as approximately follows:

Zoom Ratio: 8.6:1
Focal Length: 3-25 mm
Aperture: f/2.8-f/6.3
Full Field of View: 90 deg.-13.3 deg.
35 mm Still Equivalent: 21 mm-180 mm
35 mm Cine Equivalent: 14 mm-120 mm
Unfolded Vertex Length: 98 mm
Format: ⅓" (6 mm diagonal)
Minimum Pixel Size: 2.4 microns (3.0 megapixel total resolution)
Optical train volume: 15.6 cc
Chief Ray Angle: Less than 9 degrees throughout zoom range In this exemplary embodiment, the focal lengths covered by the zoom range have a 35 mm still camera equivalent of about 21 mm to 180 mm. This range of focal lengths in a single zoom is unprecedented for a consumer-oriented optical system, and represents virtually all of the focal lengths commonly used by photojournalists and amateur photographers.

What makes this range particularly interesting is the extremely wide angle starting point. Although it is possible to design wide-range zooms with conventional non-compound technology, such designs are generally limited at the wide end to a 35 mm format equivalent of about 24 to 28 mm. Even with this limited wide angle capability, conventional wide-range zooms will generally suffer from a large front element diameter which prevents a small package size. By contrast, compound zoom technology allows for a very small front element diameter even with a very large zoom range and extremely wide field of view.

Although compound zoom technology provides a unique capability for wide-range wide-angle optics, it has a shortcoming in that the vertex length tends to be fairly long. In the exemplary embodiment described above the vertex length is about 98 mm. In order to allow the system to be used in a compact package, two fold prisms have been included in the exemplary embodiment. It should be noted that other folding configurations are possible. If the fold prisms are eliminated it should be possible to shorten the vertex length by about 10-15 mm.

Embodiments of the present invention are particularly suited to folding because a fold prism may be placed near or within the intermediate image in any area that does not interfere with the movement of the zoom groups. In contrast, conventional compact zoom lenses have lens elements that must retract into the body of the camera, which eliminates most or all or the air gaps within the lens and precludes the insertion of a fold prism. In the example of FIG. 1, a fold prism (element 9) is located on the object side of the intermediate image, which is located between elements 10 and 11. However, in other embodiments, the fold prism may be located on the object side of the intermediate image.

In the exemplary embodiment under discussion, the folded optics train occupies only about 15.6 cc, and is small enough to occupy only a small "L" shaped portion of a box-shaped area of about 36 cc (e.g. about 57.28 mm×48.36 mm×12.97 mm), leaving about 57% of the total volume available for non-optical parts (electronics, mechanical parts, and industrial design features). In alternative embodiments, it would also be possible to take advantage of the L-shaped optical train to design a product that deviates from the ordinary box shape.

The working distance of the exemplary embodiment is sufficient to place a third fold just before the image plane. This third fold could be used to simplify the sensor placement, or it could also be used to incorporate a true SLR optical viewfinder.

The exemplary non-rotational embodiment of the present invention illustrated in FIG. 1 will now be described in greater detail with accompanying figures and tables. Referring to FIG. 1, each lens element is identified by a numeral from 1 through 15 and the general configuration of each lens element is depicted, but the actual radius of each lens surface is set forth below in a table. The lens surfaces are identified by the letter "S" followed by a numeral from S1 through S30.

Each lens element has its opposite surfaces identified by a separate but consecutive surface number as, for example, lens element 1 has lens surfaces S1 and S2, lens element 5 has lens surfaces S9 and S10 and so forth, as shown in FIG. 1, except that for doublet lens component 1D the coincident facing lens surfaces are given a single surface number S12. For example, doublet 1D is comprised of lens element 6 having a front lens surface S11 and a rear lens surface S12 and lens element 7 having a front lens surface S12 (coincidental) and a rear lens surface S13. The real image surface is identified by the numeral S30. All of the lens surfaces are spherical except lens surfaces S3, S4, S18, S21, S22, S24 and S25 which are aspheric surfaces that are non-spherical, non-plano but rotationally symmetrical about the optical axis.

Before describing the detailed characteristics of the lens elements, a broad description of the lens groups and their axial positions and movement will be given for the zoom lens system, generally designated 50, of this invention. Beginning from the end facing the object to be photographed, i.e. the left end in FIG. 1, a first lens group 51 comprises singlet lens elements 1-4. The first lens group 51 is a negative-powered group which gathers light from object space and reduces the angle of the chief ray with respect to the optical axis (identified with a ø). The first lens group is also movable along the optical axis for focusing, as is conventional. A first zoom group 52 comprises a first zoom subgroup 53 and a second zoom subgroup 54. The first zoom subgroup 53 includes the optical stop at surface S9 and comprises singlet lens element 5 and a first doublet 1D comprised of lens elements 6 and 7, and the second zoom subgroup 54 comprises a singlet lens element 8. A second lens group 55 is stationary, and comprises singlet lens elements 9-11 and an intermediate image located between elements 10 and 11 or within either element 10 or element 11. Lens elements 10 and 11 together may be identified as a field lens. A second zoom group 56 comprises a third zoom subgroup 57 and a fourth zoom subgroup 58. The third zoom subgroup 57 comprises singlet lens elements 12-14, and the fourth zoom subgroup 58 comprises a singlet lens element 15. Note that throughout the application, the word "zoom" refers to at least one element that changes the magnification of an object conjugate to an image conjugate about the at least one element. The various groups and subgroups described above can also be viewed as lens units or portions, where a first lens unit or portion can be defined to include all lens elements on the object side of the field lens, while a second lens unit or portion can be defined to including all lens elements on the image side of the field lens.

The positive or negative power of each lens element is set forth below in TABLE 1. The resultant optical power of each group of lenses is as follows; the first lens group 51 is negative, the first zoom subgroup 53 is positive, the second zoom subgroup 54 is positive, the third zoom subgroup 57 is positive, and the fourth zoom subgroup 58 is positive.

The optical design of the exemplary embodiment is comprised of an NPP kernel followed by a PP relay. There are four independently moving zoom subgroups altogether; two on each side of an intermediate image. The front lens group is stationary with respect to the image plane during zooming, as are both of the fold prisms. The kernel alone has a zoom ratio of about 2:1, and the zooming relay has a magnification ratio of about 4:1, giving a total zoom ratio of about 8.6:1. This ratio is larger than that found in nearly all of the compact digital cameras currently on the market, and the field of view at the wide end is dramatically larger than that on any current compact digital camera.

In the exemplary embodiment of the present invention described herein, the PP relay, comprising two independently moving positive zoom subgroups, has a notably simple structure which contributes significantly to the simplicity of the system as a whole. Since both zoom subgroups are positive the total number of elements is minimized while maintaining a very high image quality.

The aperture of the system ranges from about f/2.8 to f/6.3, but is constant at about f/2.8 from about 3 mm through 6.2 mm focal length. From about 6.2 mm to 25 mm the aperture drops gradually from about f/2.8 to f/6.3.

An additional feature of embodiments of the present invention is that it has a high degree of telecentricity, which will allow it to be used successfully with electronic image sensors. In the exemplary embodiment being described, the maximum chief ray angle at the image plane is only about 9 degrees, which is five times less than the maximum chief ray angle in object space of about 45 degrees.

Each of the zoom subgroups 53, 54, 57 and 58 are movable in both directions along the optical axis for focusing and zooming, depending on their positions. The stationary first lens group 51 and second lens group 55 remain stationary and at a fixed distance from the real image surface S30 during zooming. The horizontal arrows with arrowheads on both ends in the upper portion of FIG. 1 indicate that each of the zoom subgroups 53, 54, 57 and 58 are movable in both axial directions but in a monotonic manner (i.e. in only one direction when progressing from one extreme to the other of adjustments).

While only the lens elements are physically shown in FIG. 1, it is to be understood that conventional mechanical devices and mechanisms are provided for supporting the lens elements and for causing axial movement of the movable groups in a conventional lens housing or barrel.

The lens construction and fabrication data for the above described zoom lens system 50 is set forth below in TABLE 1, which is extracted from data produced by ZEMAX® optical design software that is commercially available from ZEMAX Development Corporation, San Diego, Calif., U.S.A., which was also used for producing the optical diagrams in FIGS. 2-6. Throughout this specification, including the Tables, all measurements are in millimeters (mm) with the exception of wavelengths, which are in nanometers (nm), refractive index, which is given as $n_d$, which is the refractive index at a wavelength of about 587.6 nm, and Abbe #, which is indicative of the dispersion of glass and is given as $v_d=(n_d-1)/(n_F-n_C)$, where $n_F$ is the refractive index at about 486.1 nm and $n_C$ is the refractive index at about 656.3 nm. Note that the larger the Abbe #, the smaller the dispersion. In TABLE 1, the first column "ITEM" identifies each optical element, with the same numeral or label as used in FIG. 1. The second and third columns identify the "Group" and "Subgroup," respectively, to which that optical element (lens) belongs with the same numerals used in FIG. 1. The fourth column "Surface" is a list of the surface numbers of the Stop (iris) S9 and each of the actual surfaces of the lenses, as identified in FIG. 1. The fifth column "Zoom Position" identifies five typical zoom positions (Z1-Z5) of the zoom subgroups 53, 54, 57 and 58 (illustrated in FIGS. 2-6) wherein there are changes in the distance (separation) between some of the surfaces listed in the fourth column, as described below more thoroughly. The sixth column, headed by the legend "Radius of Curvature," is a list of the optical surface radius of curvature for each surface, with a minus sign (−) meaning the center of the radius of curvature is to the left of the surface, as viewed in FIG. 1, and "Infinity" meaning an optically flat surface. The asterisk (*) for surfaces S3, S4, S18, S21, S22, S24 and S25 indicate these are aspheric surfaces for which the "radius of curvature" is a base radius, and the formula and coefficients for those two surfaces are set forth as a footnote to TABLE 1 at the * (asterisk). The seventh column "Thickness or Separation" is the axial distance between that surface (fourth column) and the next surface. For example, the distance between surface S2 and surface S3 is 1.350 mm.

The eighth and ninth columns of TABLE 1 provide the refractive index and Abbe # of each lens element. The last column of TABLE 1 headed "Aperture Diameter" provides the maximum diameter for each surface through which the light rays pass. All of the maximum aperture diameters, except for the Stop surface S9, are calculated assuming an image diagonal of 6 mm and a relative aperture ranging from f/2.8 at the shortest focal length to f/6.3 at the longest focal length. The maximum aperture diameters of the Stop surface S9 for Zoom Positions Z1-Z5 are 3.44 mm, 4.41 mm, 5.13 mm, 6.88 mm, and 9.06 mm, respectively. The relative apertures (f-number) for Zoom Positions Z1-Z5 are f/2.8, f/2.8, f/2.8, f/4.0 and, f/6.3, respectively.

TABLE 1

OPTICAL PRESCRIPTION

| Item | Group | Sub-Group | Surface | Zoom Position | Radius of Curvature (mm) | Thickness or Separation (mm) | Refractive Index ($n_d$) | Abbe # ($v_d$) | Aperture Diameter (mm) |
|---|---|---|---|---|---|---|---|---|---|
| 1 | 51 | | S1 | All | 121.840 | 1.400 | 1.74400 | 44.72 | 11.99 |
| | | | S2 | All | 10.418 | 1.350 | | | 9.66 |
| 2 | 51 | | S3 | All | −67.353* | 1.300 | 1.58913 | 61.27 | 9.56 |
| | | | S4 | All | 6.730* | 1.315 | | | 8.09 |
| 3 | 51 | | S5 | All | Infinity | 6.000 | 1.78472 | 25.76 | 8.09 |
| | | | S6 | All | Infinity | 0.200 | | | 8.83 |
| 4 | 51 | | S7 | All | 22.538 | 1.600 | 1.78472 | 25.76 | 9.13 |
| | | | S8 | Z1 | −122.247 | 10.295 | | | 9.19 |
| | | | | Z2 | | 6.652 | | | |
| | | | | Z3 | | 1.943 | | | |
| | | | | Z4 | | 0.254 | | | |
| | | | | Z5 | | 0.098 | | | |
| 5 | 52 | 53 | S9 (Stop) | All | 14.917 | 3.610 | 1.57960 | 53.89 | 9.40 |
| | | | S10 | All | −14.969 | 0.200 | | | 9.45 |
| 6 | 52 | 53 | S11 | All | 10.938 | 4.052 | 1.62004 | 36.37 | 8.83 |
| 7 | 52 | 53 | S12 | All | −8.159 | 4.532 | 1.84666 | 23.83 | 7.69 |
| | | | S13 | Z1 | 6.602 | 2.528 | | | 5.96 |
| | | | | Z2 | | 3.425 | | | |
| | | | | Z3 | | 3.489 | | | |
| | | | | Z4 | | 0.610 | | | |
| | | | | Z5 | | 2.431 | | | |
| 8 | 52 | 54 | S14 | All | 46.957 | 1.500 | 1.62004 | 36.37 | 7.04 |
| | | | S15 | Z1 | −13.923 | 2.839 | | | 7.49 |
| | | | | Z2 | | 5.581 | | | |
| | | | | Z3 | | 10.237 | | | |
| | | | | Z4 | | 14.843 | | | |
| | | | | Z5 | | 13.118 | | | |
| 9 | 55 | | S16 | All | Infinity | 10.000 | 1.62041 | 60.32 | 10.12 |
| | | | S17 | All | Infinity | 0.102 | | | 12.35 |
| 10 | 55 | | S18 | All | 10.891* | 1.772 | 1.81600 | 46.60 | 13.45 |
| | | | S19 | All | 43.725 | 1.829 | | | 13.38 |
| 11 | 55 | | S20 | All | 16.319 | 2.459 | 1.77250 | 49.60 | 12.79 |
| | | | S21 | Z1 | 49.490* | 14.987 | | | 12.17 |
| | | | | Z2 | | 13.524 | | | |
| | | | | Z3 | | 13.657 | | | |
| | | | | Z4 | | 7.946 | | | |
| | | | | Z5 | | 3.099 | | | |
| 12 | 56 | 57 | S22 | All | −4.395* | 5.811 | 1.77250 | 49.60 | 4.39 |
| | | | S23 | All | −7.289 | 1.733 | | | 5.81 |
| 13 | 56 | 57 | S24 | All | 4.740* | 3.053 | 1.77250 | 49.60 | 5.61 |
| | | | S25 | All | −19.221* | 0.235 | | | 5.03 |
| 14 | 56 | 57 | S26 | All | −30.484 | 1.145 | 1.84666 | 23.83 | 4.80 |
| | | | S27 | Z1 | 4.087 | 2.215 | | | 4.24 |
| | | | | Z2 | | 3.524 | | | |
| | | | | Z3 | | 3.247 | | | |
| | | | | Z4 | | 7.226 | | | |
| | | | | Z5 | | 3.974 | | | |
| 15 | 56 | 58 | S28 | All | 26.912 | 2.125 | 1.77250 | 49.60 | 6.05 |
| | | | S29 | Z1 | −12.153 | 7.817 | | | 6.39 |
| | | | | Z2 | | 7.957 | | | |
| | | | | Z3 | | 8.101 | | | |

TABLE 1-continued

OPTICAL PRESCRIPTION

| Item | Group | Sub-Group | Surface | Zoom Position | Radius of Curvature (mm) | Thickness or Separation (mm) | Refractive Index ($n_d$) | Abbe # ($v_d$) | Aperture Diameter (mm) |
|---|---|---|---|---|---|---|---|---|---|
| | | | | Z4 | | 9.785 | | | |
| | | | | Z5 | | 17.962 | | | |
| | | | S30 (Image) | All | Infinity | | | | 6.00 |

*Surface profiles of aspheric surfaces S3, S4, S18, S21, S22, S24 and S25 are governed by the following conventional equation:

$$Z = \frac{(CURV)Y^2}{1 + (1 - (1 + K)(CURV)^2 Y^2)^{1/2}} + (A)Y^4 + (B)Y^6 + (C)Y^8 + (D)Y^{10}$$

where:
CURV = 1/(Radius of Curvature)
Y = Aperture height, measured perpendicular to optical axis
K, A, B, C, D = Coefficients
Z = Position of surface profile for a given Y value, as measured along the optical axis from the pole (i.e. axial vertex) of the surface.
The coefficients for the surface S3 of item 2 are:
K = 0.00000
A = −1.23685E3−04
B = 1.37561E−05
C = 6.71035E−07
D = −2.80304E−08
The coefficients for the surface S4 of item 2 are:
K = −3.93370
A = 1.36469E−03
B = −5.83506E−05
C = 6.32084E−06
D = −2.03747E−07
The coefficients for the surface S18 of item 10 are:
K = 0.00000
A = −2.67152E−04
B = 8.96342E−06
C = −2.06086E−07
D = 1.58457E−09
The coefficients for the surface S21 of item 11 are:
K = 0.00000
A = −3.15977E−04
B = 6.73177E−06
C = 1.32004E−07
D = −3.75872E−09
The coefficients for the surface S22 of item 12 are:
K = 0.00000
A = 2.14145E−03
B = −5.06275E−04
C = 1.33852E−04
D = −2.57938E−08
The coefficients for the surface S24 of item 13 are:
K = 0.00000
A = −8.03814E−04
B = −8.96442E−06
C = −2.06818E−06
D = −2.57938E−08
The coefficients for the surface S25 of item 13 are:
K = 0.00000
A = 4.73018E−04
B = −4.52618E−05
C = 4.76732E−06
D = −4.54077E−07

The foregoing footnote * to TABLE 1 includes the equation for calculating the shape of the aspheric surfaces S3, S4, S18, S21, S22, S24 and S25 for the value Z, wherein CURV is the curvature at the pole of the surface, Y is the height or distance from the optical axis of a specific point on the surface of the glass, K is the conic coefficient, and A, B, C and D are the 4th, 6th, 8th, and 10th, respectively, order deformation coefficients. As noted above, for illustrating the scope and versatility of the present invention there are five different Zoom Positions Z1, Z2, Z3, Z4 and Z5 set forth in the data of TABLE 1 which provide specific data for five different positions for the four movable zoom subgroups. The Zoom Positions Z1, Z2, Z3, Z4 and Z5 are representative of five positions of the zoom subgroups 53, 54, 57 and 58 with Zoom Positions Z1 and Z5 being the extreme positions and Z2, Z3 and Z4 being intermediate positions. Of course, it will be understood that continuous zooming is available between the extreme Zoom Positions Z1 and Z5, and that any combination of continuous zooming is available within the described zoom ranges with the lens system 50. In addition, continuous focusing is available over the full range of axial motion of the first lens group 51.

Figure 6:
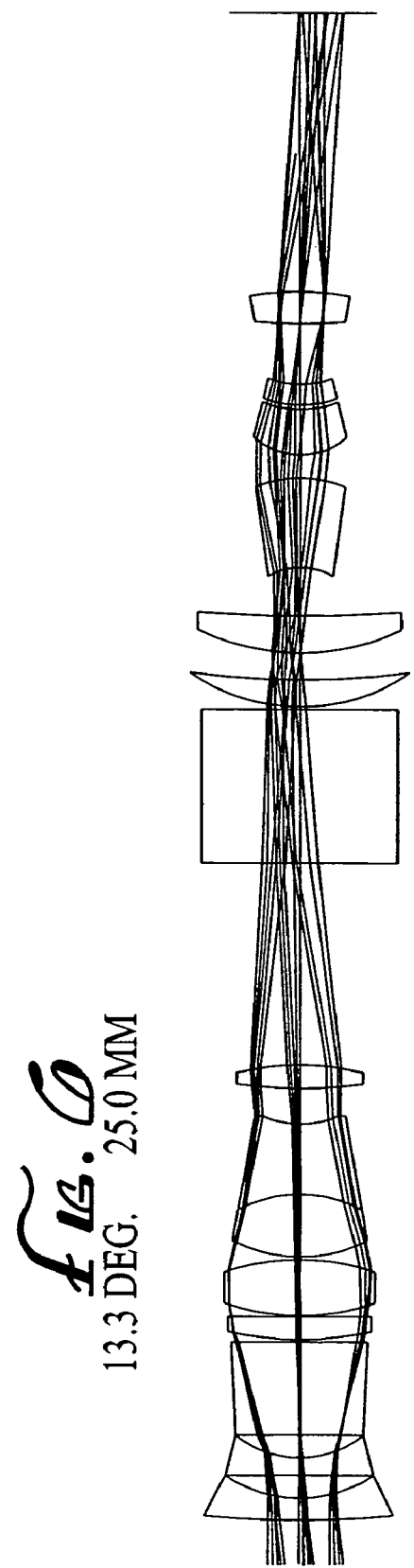
FIG. 6 illustrates an unfolded layout of the compound zoom lens at Zoom Position Z5 according to embodiments of the present invention.

The Effective Focal Length (EFL), Full Field Of View (FFOV) and F-number of the lens system 50 varies for the different Zoom Positions. Referring now to FIGS. 2-6, the zoom lens system 50 is shown with the zoom groups in various Zoom Positions and with light ray traces for those positions. FIG. 2 represents the zoom position Z1 for which data is set forth above in TABLE 1 with an EFL of about 3.1 mm, a FFOV of about 90.0°, and an F-number of about 2.8. FIG. 3 represents the zoom position Z2 from TABLE 1 with an EFL of about 4.5 mm, a FFOV of about 67.6°, and an F-number of about 2.8. FIG. 4 represents the zoom position Z3 from TABLE 1 with an EFL of about 6.2 mm, a FFOV of about 50.0°, and an F-number of about 2.8. FIG. 5 represents the zoom position Z4 from TABLE 1 with an EFL of about 12.4 mm, a FFOV of about 27.0°, and an F-number of about 4.0. FIG. 6 represents the zoom position Z5 from TABLE 1 with an EFL of about 24.9 mm, a FFOV of about 13.3°, and an F-number of about 6.3.

From the specifications for the individual lens elements (Items 1-15) and the separation between lens elements set forth in TABLE 1, the focal lengths of each lens element and then each group of lens elements (i.e. first lens group 51, first zoom subgroup 53, second zoom subgroup 54, second lens group 55, third zoom subgroup 57 and fourth zoom subgroup 58) may be calculated by using the aforementioned ZEMAX® optical design software, and those calculated group focal lengths are as follows:

First lens group 51 (elements 1-4)=−10.91 mm;
First zoom subgroup 53 (elements 5-7)=+14.69 mm;
Second zoom subgroup 54 (element 8)=+17.48 mm;
Second lens group 55 (elements 9-11)=+11.66 mm;
Third zoom subgroup 57 (elements 12-14)=+13.24 mm; and
Fourth zoom subgroup 58 (element 15)=+11.10 mm.

Also, it should be noted that the zoom lens system 50 is provided with one optical stop at the surface S9 which controls the diameter of the aperture through which light rays may pass at that point to thereby cause any light rays in the zoom lens system radially beyond that diameter to be stopped. The optical stop is the location at which a physical iris is located. The iris is located within the first zoom subgroup 53, and moves with that zoom subgroup. Note that in FIG. 2, for example, the rim rays pass through the S9 with room to spare, while in FIG. 6, the rim rays are almost touching the extreme edges of S9 as they pass through the optical stop. This shows that the iris located at S9 must open as the focal length increases. To maintain a constant f-number at the image, the iris must "zoom" or change. In other words, the iris must be adjusted for constant aperture. A separate cam may be used to open or close the iris during zooming. In addition, it should be noted that all of the lens element surface apertures, set forth in TABLE 1, act as field stops at all focus and zoom positions as depicted in FIGS. 2-6.

The four zoom subgroups 53, 54, 57 and 58 are each axially movable independently and their respective movements are coordinated by any convenient means, such as conventional mechanical devices such as cams or the like, to accomplish the desired focusing and zooming functions.

Normally, the iris of a lens system is located behind the last moving group (to the right in FIGS. 2-6) but zoom lens system 50 has the iris S9 located within the first zoom subgroup 53 and therefore the iris S9 moves axially therewith. The size of the aperture of iris S9 is adjusted as the first zoom subgroup 53 moves axially, as described above, with respect to the maximum aperture diameters listed in TABLE 1 and is given with its largest value in TABLE 1.

Figure 7:
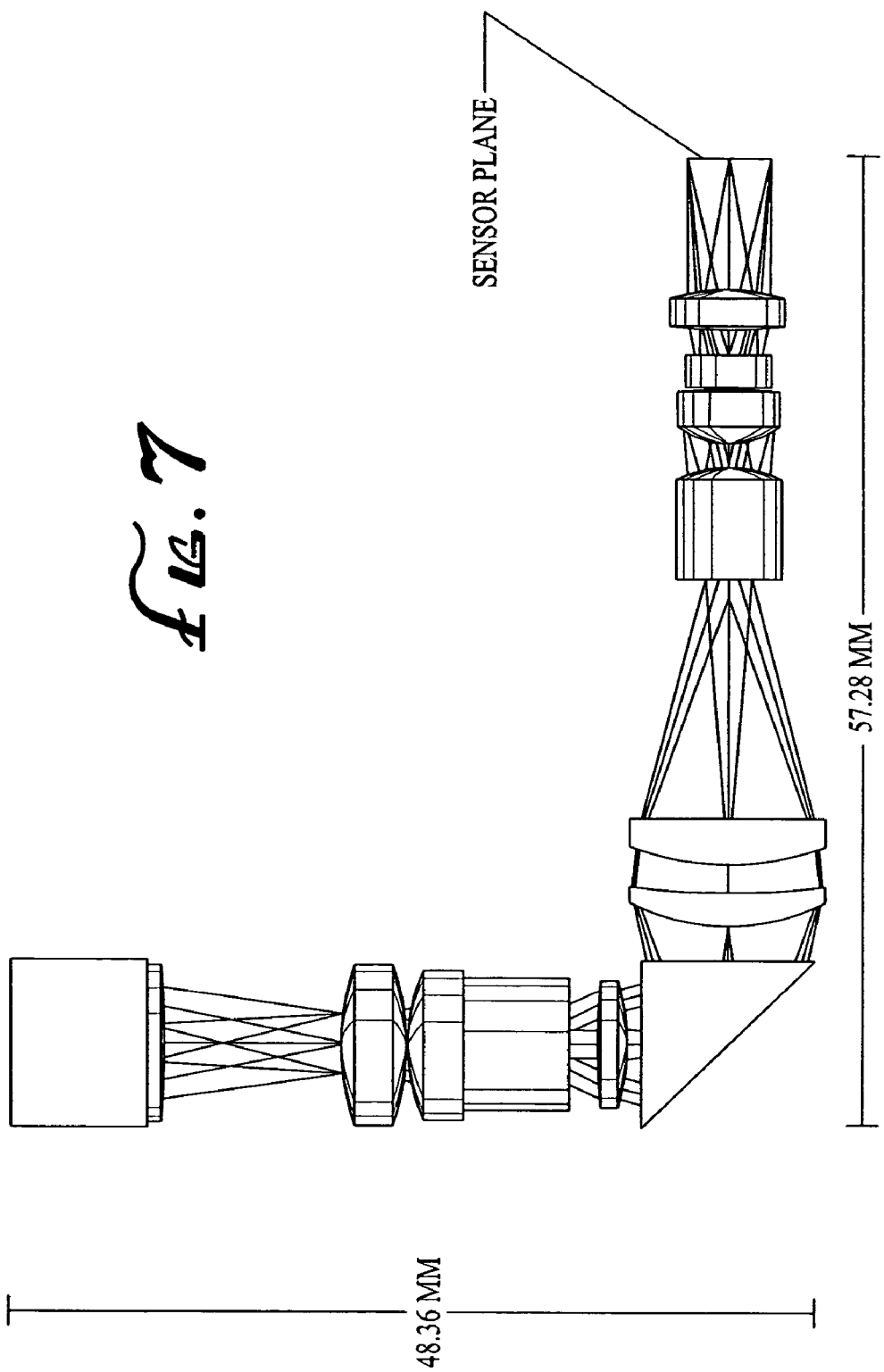
FIG. 7 illustrates a folded layout of the compound zoom lens showing its longest dimensions, with input beams being received from out of the page at the upper left according to embodiments of the present invention.
Figure 8:
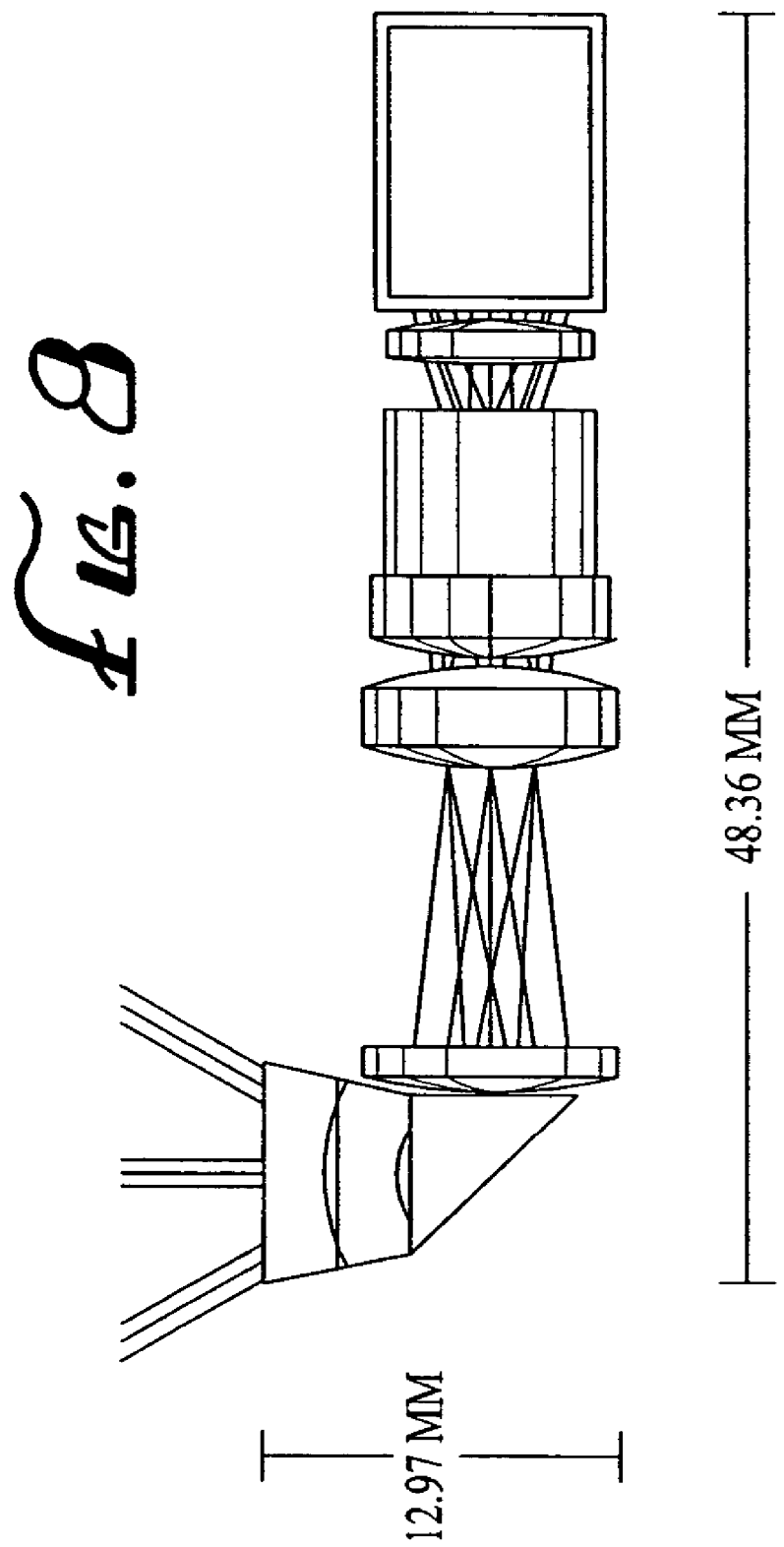
FIG. 8 illustrates the folded layout showing its thinnest dimensions according to embodiments of the present invention.
Figure 9:
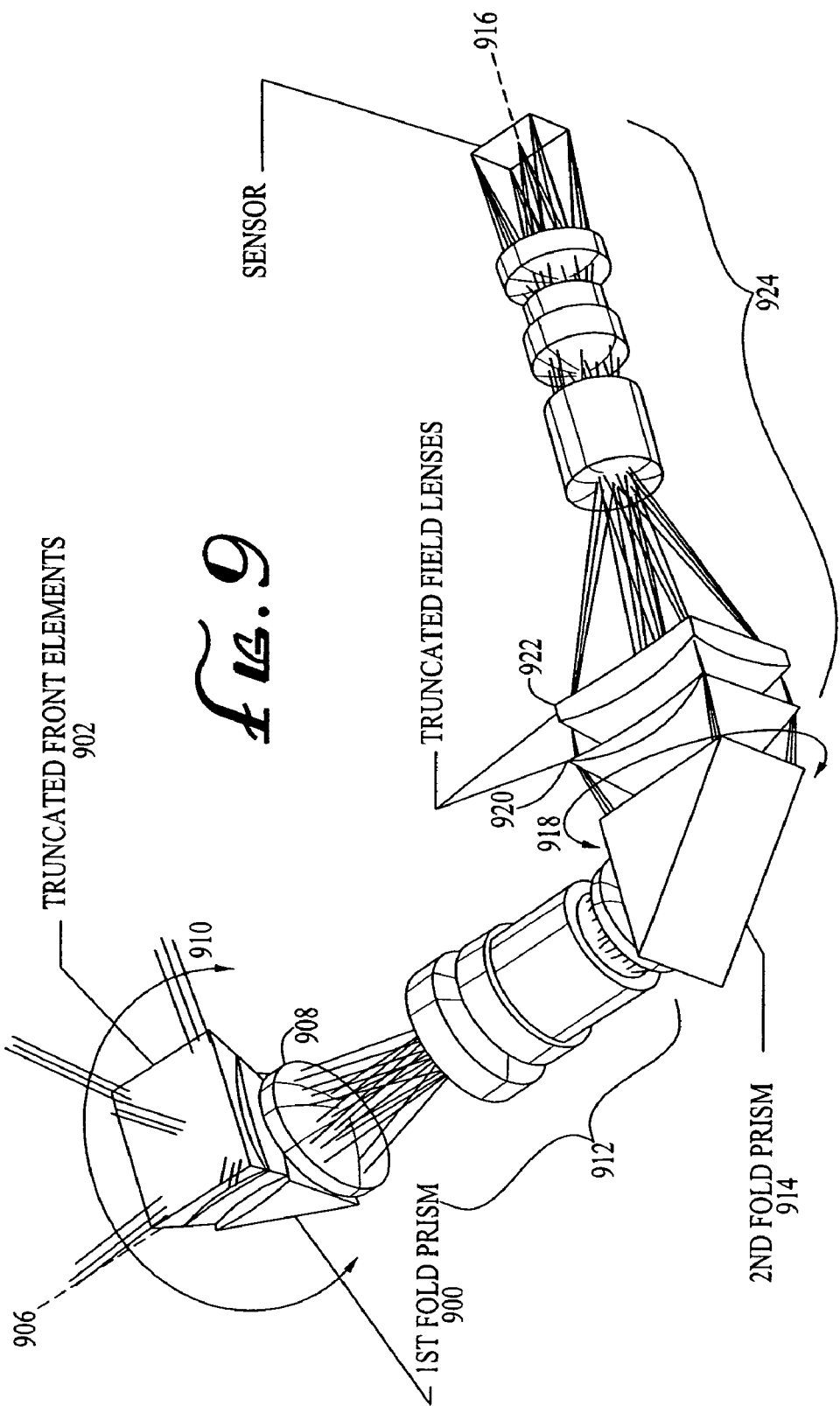
FIG. 9 is a three dimensional view of the compound zoom lens system according to embodiments of the present invention.
Figure 10:
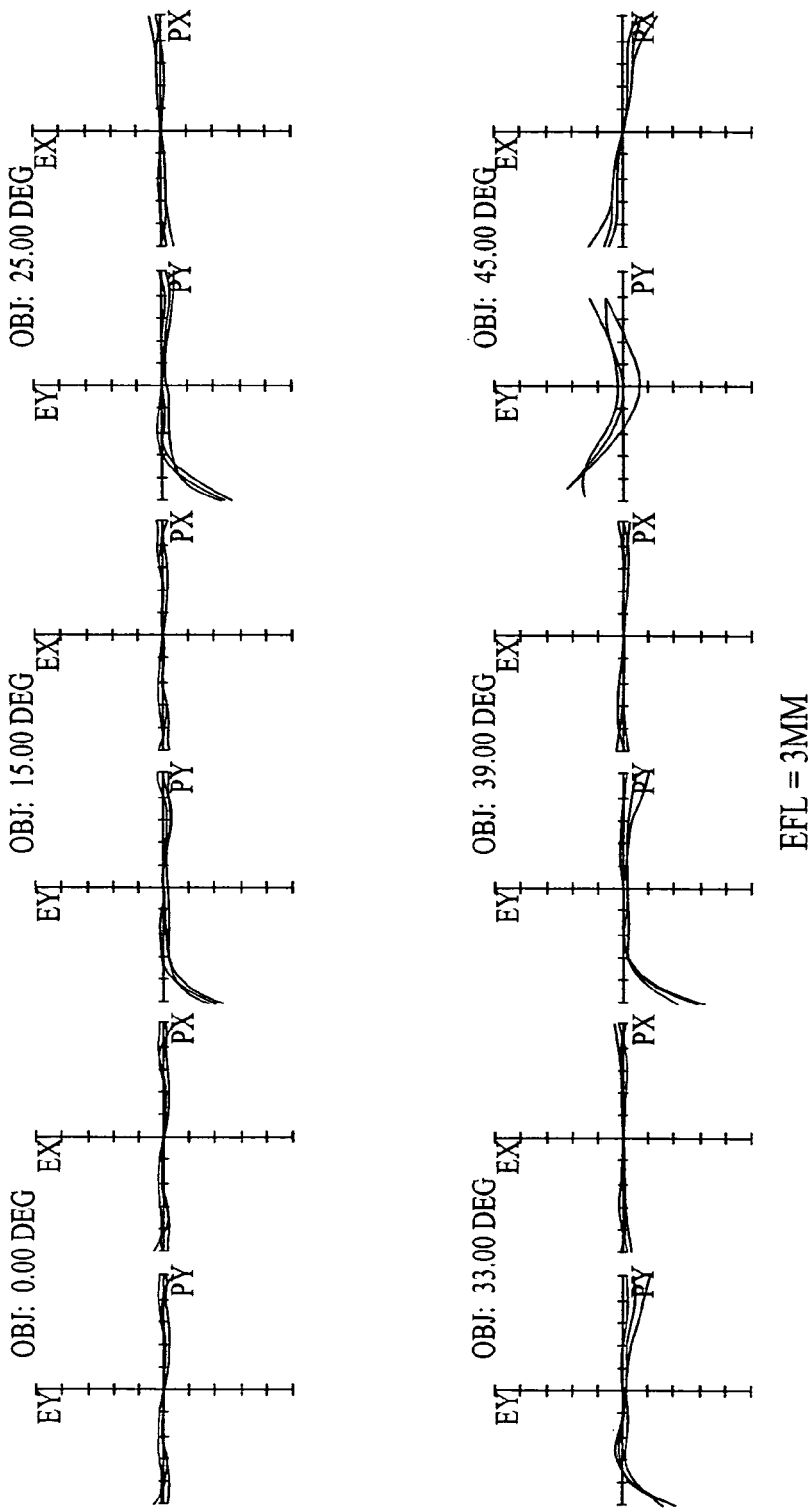
FIG. 10 illustrates transverse ray aberration plots at Zoom Position Z1 with an effective focal length (EFL) of about 3 mm and a field of view (FOV) of about 90 degrees according to embodiments of the present invention.
Figure 12:
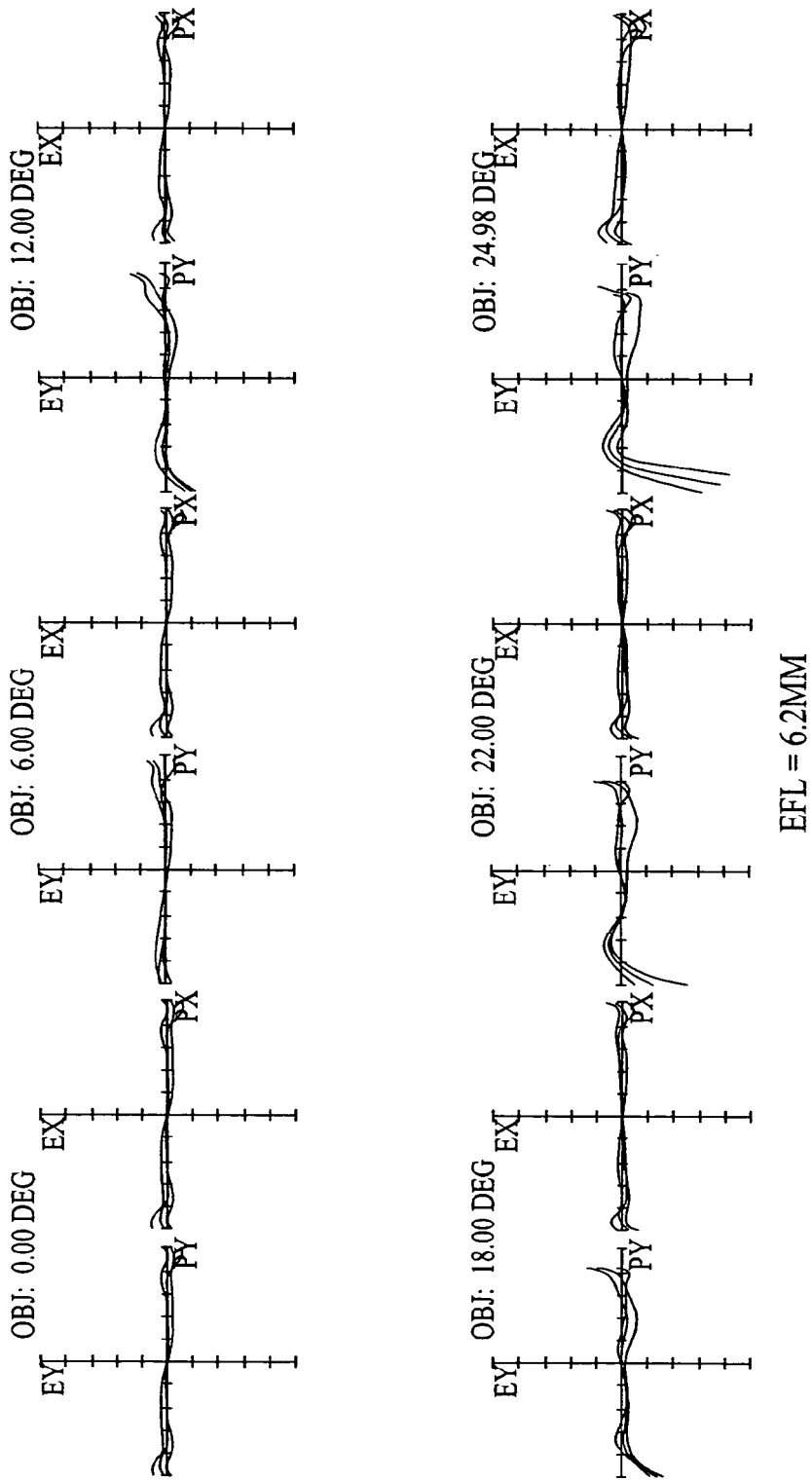
FIG. 12 illustrates transverse ray aberration plots at Zoom Position Z3 with an EFL of about 6.2 mm and a FOV of about 50 degrees according to embodiments of the present invention.
Figure 13:
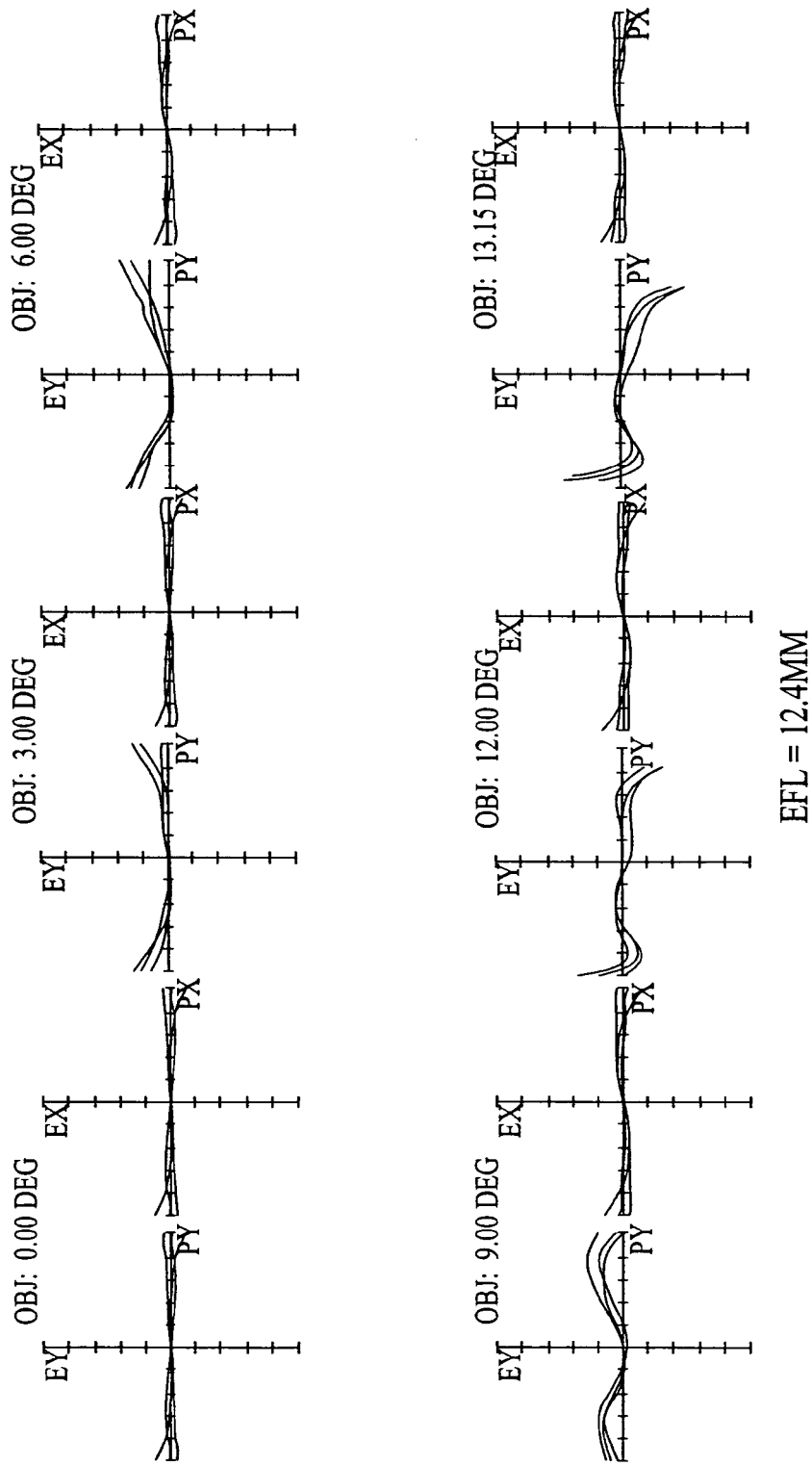
FIG. 13 illustrates transverse ray aberration plots at Zoom Position Z4 with an EFL of about 12.4 mm and a FOV of about 26.3 degrees according to embodiments of the present invention.

FIGS. 7 and 8 show two different views of a folded non-rotational system with overall dimensions. FIG. 9 shows a three-dimensional view of the system. As indicated in FIG. 9, the front two elements and the two field lenses can be truncated with a rectangular profile in non-rotational embodiments to minimize bulk.

The specifications, performance and optical prescription described and illustrated throughout this application generally correspond to a non-rotating compound zoom lens. However, the optional rotational capability of the compound zoom lens is illustrated in FIG. 9. In one embodiment, the first fold prism 900 and the front elements 902 (which may be round instead of truncated in rotating embodiments) may rotate as a unit about the optical axis 906 with respect to the lens element 908 and all other lens elements and prisms on the image side of the first fold prism 900, as indicated by arrow 910. However, in alternative embodiments the rotation could occur between any of the lens elements 912. In another embodiment, the second fold prism 914 and all elements and prisms on the object side of the second fold prism 914 may rotate as a unit about the optical axis 916 with respect to the elements and prisms on the image side of the second fold prism 914, as indicated by arrow 918. Note that elements 920 and 922 may be round instead of truncated in rotating embodiments. However, in alternative embodiments the rotation could occur between any of the lens elements 924. In further alternative embodiments, both rotations are possible. These rotations may allow part of the compound zoom lens to be located in the hinge of a clamshell style cellular telephone, for example.

It should also be understood that in order to preserve the example specifications, performance and optical prescription described and illustrated herein and avoid vignetting, rotational embodiments of the present invention require that the detector have a square aspect ratio, each side of the detector being equivalent to the smallest dimension of the rectangular image formed by the optical prescription of the non-rotational embodiment described herein. Alternatively, in order to preserve the image formed by the optical prescription of the non-rotational embodiment described herein and avoid vignetting, rotational embodiments of the present invention require some straightforward revisions to the optical prescription to provide for larger prisms and changes to the other lens elements. By doing so, a rectangular image may be captured regardless of how the zoom lens is rotated.

Referring now to FIGS. 10-14, the ray aberration graphs for Zoom Positions Z1-Z5, respectively, are shown in a conventional manner by six separate pairs of graphs with the maximum field height of 45° at the lower right corner and zero field height at the upper left corner and for three wavelengths (486 nm, 588 nm, and 656 nm). The left graph in each pair is the Y-FAN, while the right graph in each pair is the X-FAN. Each tic mark on the vertical axis represents 10 microns, and thus the maximum scale is +/−50 microns. As will readily appear to those skilled in the art, these performance curves establish that in all five Zoom Positions the zoom lens system performs exceptionally well for current broadcast television NTSC quality and very well for HDTV broadcast television quality.

Although the present invention has been fully described in connection with embodiments thereof with reference to the accompanying drawings, it is to be noted that various changes and modifications will become apparent to those skilled in the art. Such changes and modifications are to be understood as being included within the scope of the present invention.

What is claimed is:

1. A zoom lens system for forming a final image of an object, said system having an object side and an image side and forming a first intermediate real image between the object and the final image, said system comprising in order from the object side to the image side:

a first zoom group including at least two lens elements and located between the object and the first intermediate real image, said first zoom group comprising at least a first zoom subgroup and a second zoom subgroup which are movable along an optical axis to change a magnification of the first intermediate real image;

a second zoom group including at least two lens elements and located between the first intermediate real image and the final image, said second zoom group comprising at least a third zoom subgroup and a fourth zoom subgroup which are movable along the optical axis to change the magnification of the final image; and a first lens group on the object side of the first zoom group having negative power, the first lens group for producing a maximum field of view of greater than about 85 degrees;

wherein the zoom lens system has a zoom ratio of less than 10 to 1; and wherein the first lens group and the first zoom group having a zoom ratio of about 2:1.

2. The zoom lens system as recited in claim 1, the first lens group including a fold prism for folding the gathered light and the optical axis.

3. The zoom lens system as recited in claim 2, wherein the fold prism and all lens elements on the object side of the fold prism are rotatable as a unit about the optical axis.

4. The zoom lens system as recited in claim 1, the first lens group having a maximum aperture diameter of about 12 mm.

5. The zoom lens system as recited in claim 1, wherein the first lens group is stationary with respect to the final image during zooming.

6. The zoom lens system as recited in claim 1, the first zoom group comprising an optical stop.

7. The zoom lens system as recited in claim 1, the first lens group and the first and second zoom subgroups having a −++construction.

8. The zoom lens system as recited in claim 1, wherein one lens element within the first lens group or the first zoom group and all lens elements on the object side of the one lens element are rotatable as a unit about the optical axis.

9. The zoom lens system as recited in claim 1, further comprising a second lens group located between the first zoom group and the second zoom group, said second lens group including or having adjacent to it the first intermediate real image.

10. The zoom lens system as recited in claim 9, wherein the first intermediate real image is formed in an air space between lens elements in the second lens group.

11. The zoom lens system as recited in claim 10, the second lens group including a fold prism for folding the gathered light and the optical axis.

12. The zoom lens system as recited in claim 11, wherein the fold prism and all lens elements on the object side of the fold prism are rotatable as a unit about the optical axis.

13. The zoom lens system as recited in claim 9, the second lens group having a+ construction.

14. The zoom lens system as recited in claim 9, the second lens group being stationary with respect to the final image.

15. The zoom lens system as recited in claim 1, the second zoom group having a zoom ratio of about 4:1 to change the magnification of the final image.

16. The zoom lens system as recited in claim 1, the third and fourth zoom subgroups having a++ construction.

17. The zoom lens system as recited in claim 1, wherein one lens element within the second zoom group and all lens elements on the object side of the one lens element are rotatable as a unit about the optical axis.

18. The zoom lens system as recited in claim 1, further comprising at least one fold prism located in an area that does not interfere with movement of the first and second zoom groups.

19. The zoom lens system as recited in claim 1, further comprising a first intermediate real image located near or within a fold prism.

20. The zoom lens system of claim 1, further comprising at least one aspheric optical surface.

21. The zoom lens system as recited in claim 20, the at least one aspheric optical surface for contributing to the correction of at least one of distortion and spherical aberrations.

22. The zoom lens system as recited in claim 1, the first and second zoom groups for producing a zoom ratio greater than about 4:1 and having a maximum field of view of at least 80 degrees.

23. The zoom lens system as recited in claim 1, wherein the zoom lens system forms a chief ray angle of about 9 degrees at the final image.

24. A zoom lens system for forming a final image of an object, the zoom lens system having a range of focal lengths between a maximum focal length and a minimum focal length and forming at least a first intermediate real image between the object and the final image for all focal lengths within the range of focal lengths, the zoom lens system having an object side and an image side and comprising in order from the object side to the image side:

a first lens unit having a focal length that is changed to change the magnification of the first intermediate real image, the first lens unit being located between the object and the first intermediate real image; and a second lens unit for changing the magnification of the final image, the second lens unit being located between the first intermediate real image and the final image;

wherein the zoom lens system has a zoom ratio of less than 10 to 1; and wherein the zoom lens system has a maximum field of view of 65 degrees or more.

25. The zoom lens system as recited in claim 1, wherein at least one of the zoom subgroups is movable to hold an axial position of the final image substantially stationary as the focal length of the system is changed.

26. A zoom lens system for forming a final image of an object, the zoom lens system having a range of focal lengths between a maximum focal length and a minimum focal length and forming at least a first intermediate real image between the object and the final image for all focal lengths within the range of focal lengths, the zoom lens system having an object side and an image side and comprising in order from the object side to the image side:

a first lens unit having a variable focal length, the first lens unit being located between the object and the first intermediate real image; and a second lens unit having a variable magnification, the second lens unit being located between the first intermediate real image and the final image;

wherein the zoom lens system has a zoom ratio of less than 10 to 1;

wherein the zoom lens system has a maximum field of view of 65 degrees or more.

27. A zoom lens system for forming a final image of an object, said system having an object side and an image side and forming a first intermediate real image between the object and the final image, said system comprising in order from the object side to the image side:
- a first zoom group including at least two lens elements and located between the object and the first intermediate real image, said first zoom group comprising at least a first zoom subgroup and a second zoom subgroup which are movable along an optical axis to change a magnification of the first intermediate real image;
- a second zoom group including at least two lens elements and located between the first intermediate real image and the final image, said second zoom group comprising at least a third zoom subgroup and a fourth zoom subgroup which are movable along the optical axis to change the magnification of the final image;
- wherein the zoom lens system has a zoom ratio of less than 10 to 1; and
- wherein the first and second zoom groups for producing a zoom ratio greater than about 4:1 and having a maximum field of view of at least 80 degrees.

28. A zoom lens system for forming a final image of an object, the zoom lens system having a range of focal lengths between a maximum focal length and a minimum focal length and forming at least a first intermediate real image between the object and the final image for all focal lengths within the range of focal lengths, the zoom lens system having an object side and an image side and comprising in order from the object side to the image side:
- a first lens unit having a variable focal length, the first lens unit being located between the object and the first intermediate real image; and
- a second lens unit having a variable magnification, the second lens unit being located between the first intermediate real image and the final image;
- wherein the zoom lens system has a zoom ratio of less than 10 to 1; and
- wherein the first and second lens units produce a zoom ratio greater than about 4:1 and have a maximum field of view of at least 80 degrees.

* * * * *